3,309,352
ALKYLOLAMINE PHOSPHATED ALKYLOLAMIDES PREPARED BY HEATING A MIXTURE OF FAT, PROTEIN, AN ALKYLOLAMINE AND PHOSPHORIC ACID
Harland H. Young, Western Springs, and Kurt H. Spitzmueller, Clarendon Hills, Ill., assignors to Swift & Company, Chicago, Ill., a corporation of Illinois
No Drawing. Original application Oct. 19, 1959, Ser. No. 847,057, now Patent No. 3,151,137, dated Sept. 29, 1964. Divided and this application Mar. 31, 1964, Ser. No. 356,059
1 Claim. (Cl. 260—112)

This application is a division of application Serial No. 847,057 filed Oct. 19, 1959, now U.S. Patent No. 3,151,137.

This invention relates to new compositions of matter and methods for producing such compositions and, more particularly, to the production of compositions having the ability to modify the surface behavior of materials in which they are embodied.

Derivatives of amino alcohols have been proposed heretofore as detergents and in other areas of use where compositions having the ability of altering surface properties of liquids and solids are required. The compositions of this invention, while derivatives of amino alcohols, provide many advantages not exhibited by previously known amino alcohol derivatives. The novel compositions of this invention because of their peculiar hydrophilic-lypophilic balance are useful as detergents, wetting agents, emulsifying agents, frothing agents, etc.

It is, therefore, an object of this invention to provide new chemical compositions.

Another object is the provision of a method for producing new surface-active compositions.

Additional objects, if not specifically set forth herein, will be readily apparent to those skilled in the art from the detailed description of the invention which follows.

The compositions of this invention are described generally as comprising aliphatic amino alcohols bridged by means of a phosphate ester linkage to an alkylolamide. Considerable variation in structure of the compositions is possible inasmuch as any of a large number of acyl groups may be present in the alkylolamide and any of a number of alkylolamines may be employed in the alkylolamine portion of the molecule. Similarly, diverse combinations of alkylolamine radicals may be present in the alkylolamine and alkylolamide portions of the molecule. Nevertheless the compositions, irrespective of the particular alkylolamine groups or acyl groups employed, are water-soluble and possess the property of modifying surface behavior of liquids in which they are incorporated. This modification of surface behavior is observed in aqueous solutions containing large quantities of electrolytes. This is an important advantage when it is realized that the majority of previously known amino alcohol derivatives are not compatible with aqueous solutions containing more than small amounts of electrolytes. Abnormally hard waters and brines tend to salt out many of the known alkylolamides resulting in a substantial reduction in the effectiveness of these compositions. Moreover small amounts of electrolytes frequently produce appreciable turbidity and sometimes separation of the surfactant. On the other hand, the phosphoric acid bridged alkylolamine-alkylolamides of this invention are quite soluble even in 20% aqueous sodium chloride (brine) solutions. This feature is important where the compositions are employed to inhibit corrosion in brine systems.

More specifically, the compositions are complex mixtures obtained by reacting primary, secondary, or tertiary alkylolamines with a phosphoric acid to produce a monoalkylolamino ester of the phosphoric acid and condensation of the ester with an alkylolamide. The monoalkylolamino ester of the phosphoric acid in the case of monoethanolamine and metaphosphoric acid undergoes an auto-neutralization as follows:

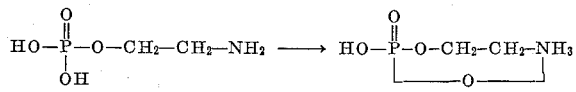

The available acidic hydrogen-ion is then free to react with the alcoholic function of the alkylolamide.

Phosphorus in the pentavalent form, specifically in the form of phosphorus pentoxide or hydrates thereof, is employed to provide the phosphoric acid bridge in the alkylolamine derivative. Orthophosphoric acid, metaphosphoric acid, pyrophosphoric acid, and certain commercially available polyphosphoric acids are suitable sources of the phosphoryl group comprising the bridge between the alkylolamine and alkylolamide. While orthophosphoric acid (85%) is quite satisfactory as the source of the phosphoric bridge, it is often desirable to fortify this acid by dissolving phosphorus pentoxide therein to produce what is believed to be 100% phosphoric acid equivalent or any intermediate hydrate which is desired. Metaphosphoric acid which is only slightly hydrated is a very desirable source of the phosphate bridge inasmuch as water is liberated in the esterification.

Amino alcohols which may be reacted with the phosphoric acid to form the alkylolamino phosphate include primary, secondary, and tertiary amino aliphatic alcohols having amine and hydroxyl groups on different carbons on the chain. Alkylolamines of 2–6 carbon atoms are very satisfactory for this purpose. Typical alkylolamines which may be condensed with phosphoric acid to form the bridge are monoethanolamine, diethanolamine, triethanolamine, monoisopropanolamine, diisopropanolamine, triisopropanolamine, N,N-dimethyl ethanolamine, N,N-diethyl ethanolamine, N,N-diisopropyl ethanolamine, N,N-ethyl hexyl ethanolamine, N-methyl diethanolamine, and other alkylolamine derivatives having a reactive hydroxyl hydrogen.

The alkylolamides with which the alkylolamine-phosphoric acid ester is condensed include fatty alkylolamides of primary and secondary but not tertiary alkylolamines. The fatty acyl portion of the alkylolamide is derived from either saturated or unsaturated fatty acids of 4–26 carbons. The fatty acids may be unsubstituted or substitiuted with non-interfering substituents. Typical alkylolamines of 2–6 carbons which may be employed in the formation of the alkylolamide are the primary and secondary alkylolamines mentioned above as suitable in formation of the phosphoric acid bridged alkylolamine and in addition such compositions as monoglycerol amine, 2-amino propanediol-1,3.

The esterifiable phosphoric acid bridge alkylolamine may be prepared by reacting metaphosphoric acid, for example, with an alkylolamine in the following manner:

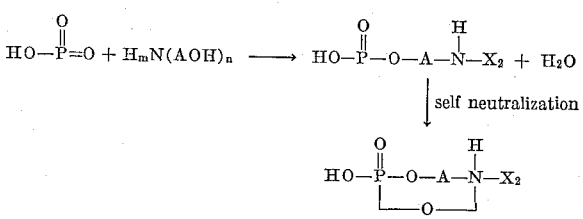

where A is an alkylene radical of 2–6 carbons, X is selected from H and AOH, $m=0-2$ and $n=1-3$.

The bridged alkylolamine is then condensed with an alkylolamide as follows:

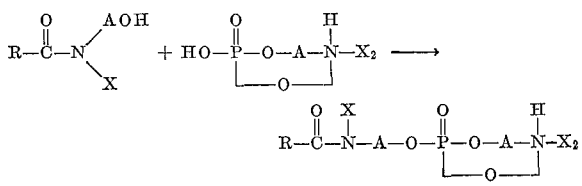

where R is selected from the group consisting of alkyl radicals of 6–22 carbons and alkenyl radicals of 6–22 carbons, A is selected from the group consisting of alkylene radicals of 2–6 carbons, and X is selected from the group consisting of H and hydroxy alkyl radicals having one OH group and 2–6 carbons.

In the preparation of the bridged alkylolamine the amino alcohol and phosphoric acid are mixed and heated, if necessary, until water is no longer evolved. When metaphosphoric acid is employed as the source of phosphorus, it is necessary only to gently warm equimolecular quantities of the reactants to initiate the reaction. Orthophosphoric acid fortified with phosphorus pentoxide must be heated with the alkylolamine for about 10–15 minutes at 180° C. to remove water, while the use of pyrophosphoric acid requires that the mixture with the alkylolamine be heated at about 160° C. for about 30 minutes. When orthophosphoric acid (85%) is reacted on an equimolar basis with the alkylolamine, heating at 175° C. for about one hour is required. In all cases equimolar amounts of the phosphoric acid and alkylolamine are reacted to produce very viscous liquid esters of the alkylolamine. It appears that there is in addition some polyester formation accompanying production of the ester.

The phosphorylated alkylolamines because they contain some unneutralized phosphoric acid residue are not miscible with the fatty acid alkylolamide, and it is preferable when conducting the esterification reaction to add sufficient alkylolamine to the phosphorated alkylolamine-fatty acid alkylolamide mixture to obtain a homogeneous mass.

One method for preparation of the bridged alkylolamine-alkylolamide is set forth in Examples I–X which follow. These examples, as with the other examples included in this specification, are intended as illustrations of specific embodiments of the invention and are to be considered in no sense limitative, the scope of the invention being determined by the appended claim.

*Example I*

Hydrated phosphorus pentoxide is prepared by pouring 115 grams of phosphoric acid (85%) over 71 grams phosphorus pentoxide and the mixture is stirred until a clear solution is obtained. During this stirring the temperature rises to 165° C. When the solution is clear, 210 grams of diethanolamine is added with agitation at a rate sufficient to maintain the temperature at 180–185° C. When all of the alkylolamine is added, the temperature is raised to 190° C., at which point some of the available moisture volatilizes. Heating is continued until the temperature reaches 200° C. After cooling to room temperature, the phosphated diethanolamine is a very viscous clear liquid.

Fifty grams of this phosphated diethanolamine is added to 100 grams of lauric acid diethanolamide in a reaction vessel equipped with a stirrer, and an additional 150 grams of diethanolamine is added to produce a clear oily solution. This clear oily solution is insoluble in 20% brine, but after heating and agitating the reaction mixture at 200° C. for 10 minutes the phosphoric acid bridged diethanolamine-lauric acid diethanolamide is formed as indicated by the fact that aliquot of the reaction product is miscible in 20% brine. Also the product exhibits a powerful sudsing property. Further heating at 200° C. produced no significant difference in the product.

*Example II*

Diethanolamine (26 grams) is mixed with 29 grams of orthophosphoric acid (85%), the addition being gradual inasmuch as an exothermic reaction results. As the temperature of the mixture increases some water is volatilized. External heat is then applied to raise the temperature to 200–230° C. and the water which is volatilized is recovered and weighed. Nine grams of water is recovered, this amount corresponding to the 15% water in the original acid and the water produced by esterification. After cooling the reaction product, this product along with 140 grams diethanolamine is added to 100 grams lauric acid diethanolamide and the reaction components are vigorously agitated. The clear oily liquid reaction mixture is heated for about 45 minutes at 200° C. until the reaction product forms a clear solution in brine.

*Example III*

Fortified orthophosphoric acid is prepared by dissolving 71 grams phosphorous pentoxide in 116 grams of orthophosphoric acid (85%) in a flask equipped with facilities for heating, stirring, and application of vacuum. Solution of the phosphorus pentoxide in the orthophosphorus acid is complete when the temperature of the mixture has reached about 160° C. At this point 300 grams of triethanolamine is added gradually so that the maximum temperature of the reaction does not exceed 200° C. This reaction temperature is maintained until moisture vapor is no longer being evolved. This involves about 10–15 minutes reaction time after completion of the triethanolamine addition.

Fifty grams of this phosphated triethanolamine is added to 100 grams of lauric acid diethanolamide along with 150 grams of additional diethanolamine to promote compatibility and heating is continued for 30 minutes at 200° C. The product is an extremely viscous glassy solid approaching a plastic tacky state. This increased viscosity is typical of compositions prepared from trialkylolamines as the amine reactant. Trialkylolamine phosphates are much more viscous than those prepared employing dialkylolamines which in turn are more viscous than those prepared from the monoalkylolamines. This is believed to be attributable to polyester formation through multi-alcohol functions in the di- and trialkylolamines.

*Example IV*

Fortified orthophosphoric acid is prepared as in the preceding example by dissolving 71 grams phosphorous pentoxide in 116 grams phosphoric acid (85%) until a clear solution is produced. At this point and while the temperature of the fortified phosphoric acid is about 160° C., 122 grams of monoethanolamine is added gradually with agitation. The temperature of the mixture rises to 200° C. as the amine is added. When the evolution of moisture vapor has ceased, the phosphated monoethanolamine condensation product is cooled and 50 grams of the cooled reaction product is mixed with 100 grams of lauric acid diethanolamide and 200 grams of diethanolamine. The mixture is agitated and heated to 200° C. for 20 minutes. The reaction product is soluble in 20% brine solution. Yet it is slightly less soluble than the same product prepared using diethanolamine as the amine-supplying component and also less soluble than the same product wherein triethanolamine is employed as the amine-supplying component.

*Example V*

Phosphated triethanolamine is prepared in accordance with the procedure set forth in Example III above. Fifty grams of this phosphated triethanolamine was added to 143 grams of tall oil diisopropanolamide. The mixture was agitated and heated in the presence of 190 grams of diisopropanolamine to a temperature of 200° C. At this temperature about 30 minutes is required to remove water formed in the condensation reaction. The phosphoric acid bridged triethanolamine-tall oil fatty acid diisopropanolamide is an extremely viscous plasticlike glassy solid with good solubility in brine solution and excellent sudsing power.

*Example VI*

Fifty grams of the phosphated triethanolamine prepared as in the preceding example was added to 115 grams of soybean oil fatty acid monoethanolamide. Mutual solubility is promoted by the addition of 150 grams diethanolamine. The mixture is agitated and heated to 200° C. for 15 minutes to obtain a product which is compatible with the concentrated brine solution and which exhibits surface active properties.

*Example VII*

Fortified orthophosphoric acid is prepared in accordance with the method set forth in Example III above. The polyphosphoric acid solution is clear, the phosphorus pentoxide having dissolved, and the temperature of the solution is 160° C. when 179 grams of N,N-dimethyl ethanolamine is added with stirring. The rate of addition of N,N-dimethyl ethanolamine is controlled so that the temperature does not exceed 200° C. After about 15 minutes at this temperature moisture vapor is no longer evolved and the reaction mixture is cooled to about 100° C., at which point 834 grams of tallow fatty acid diethanolamide is added along with 1,000 grams of diethanolamine. The mixture is agitated and again heated to 200° C. and held at this temperature for about 15 minutes, at which time no additional water is evolved. The product shows good solubility in concentrated brine.

*Example VIII*

Phosphated diethanolamine is prepared by mixing 116 grams of orthophosphoric acid (85%) and 71 grams phosphorus pentoxide until the phosphorus pentoxide is dissolved. The temperature of the mixture is about 170° C. at this point and 200 grams of diethanolamine is slowly added at a rate which is sufficient to maintain the temperature at a maximum of 200° C. When the evolution of water ceases 414 grams of lard oil fatty acid monoethanolamide and 355 grams of monoethanolamine are added and the mixture agitated, the temperature of the reaction being maintained at about 200° C. The reaction is complete with the production of the phosphate bridged diethanolamine-lard oil fatty acid monoethanolamide after about 15 minutes at this temperature.

*Example IX*

The phosphated triethanolamine (50 grams) prepared in accordance with the procedure set forth in Example III above is reacted with 150 grams diethanolamine and 129 grams of the diethanolamide prepared from 60° titer hard fat by agitating the mixture of these components and heating to about 200° C. Temperature is maintained until no more water is evolved. The reaction product obtained after cooling of the reaction mixture is a viscous liquid.

*Example X*

One hundred sixteen grams phosphoric acid (85%) is poured over 71 grams phosphorus pentoxide with adequate mixing until the phosphorus pentoxide is solvated. The temperature rises to about 160° C., at which point 122 grams monoethanolamine is added. The addition of the amine is regulated so that the temperature of the reaction mixture does not rise above about 210° C. Fifty grams of this mixture after cooling is added to 110 grams of coconut oil diisopropanolamide and 190 grams of diisopropanolamine. The mixture of the three components is agitated vigorously and heated with the removal of the water (about 200° C. for about 15 minutes). At this point the reaction mixture is miscible with a saturated brine solution.

In another embodiment of the invention bridged alkylolamine-alkylolamide compositions are produced in a one-step reaction without performing the fatty acid alkylolamide and the phosphorated alkylolamine. The one-step method should be used only when the alkylolamine group desired in the fatty acid alkylolamide and the alkylolamine group in the phosphorylated alkylolamine can be the same. Also the one-step method can be employed with heterogeneous reaction mixtures where primary and secondary amino alcohols are reacted. Examples XI–XIV which follow show this one-step reaction.

*Example XI*

The compositions reacted in the method illustrated in Example II are treated by the one-step method in this case. Fifteen grams of orthophosphoric acid (85%) is added to a reaction vessel followed by the addition of 50 grams coconut oil and 187 grams diethanolamine. The flask is equipped with heating and stirring apparatus and also with vacuumizing equipment. The mixture is agitated vigorously and heated gradually to a temperature of 175° C., at which point all moisture has evaporated. Heating with stirring is continued for one hour at a temperature ranging from 185–203° C. The reaction product after cooling is clear and very light-colored and, in general, identical in properties with the product prepared in Example II.

*Example XII*

Fifteen grams orthophosphoric acid (85%) is added to flask along with 71.3 grams of castor oil and 187 grams of diethanolamine. The mixture is agitated and heated gradually to a temperature of 175° C., at which point all moisture has been removed. Heating with stirring is continued for an additional hour at about 190–200° C. to produce the phosphoric acid bridged diethanolamine-castor oil diethanolamide.

*Example XIII*

Soybean oil (66 grams), 14.6 grams of orthophosphoric acid (85%), and 222 grams of diethanolamine are placed in a reaction vessel. The mixture is agitated and heated for one hour at a temperature of 190–205° C. The cooled liquid reaction product is miscible with a saturated salt solution.

*Example XIV*

A similar product prepared from 66 grams of hydrogenated tallow (60° titer), 229 grams diethanolamine, and 15 grams phosphoric acid (85%) is a fluid water-soluble oil with considerable foaming power. It would not be expected that a fluid product would be obtained in this case inasmuch as the alkylolamides of stearic and palmitic acids which form a large part of the fatty acid portion of tallow are waxlike solids.

Another embodiment of the invention involves the preparation of complex mixtures of surface active materials from natural products containing fat and protein. The process of treating such materials and the valuable products obtained provide a means for upgrading waste proteinaceous stock and protein by-products.

In our copending applications, Serial No. 820,848, filed June 17, 1959, now U.S. Patent No. 3,230,210, and Serial No. 847,057, filed Oct. 19, 1959, now Patent No. 3,151,137 methods for amidating proteinaceous materials to produce amidated proteins are described. Also described is the process for acylating the amidated protein. These amidated, acylated proteins can be reacted with phosphorus bridged amines of the formula:

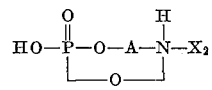

where A is selected from the group consisting of alkylene radicals of 2–6 carbons and X is selected from the group consisting of H and hydroxy alkyl radicals having 2–6 carbon atoms, to prepare surface active proteinaceous compositions. In those cases where the protein is amidated with an amino alcohol there are available hydroxyl groups for reaction with the phosphoryl radical to form the bridged compositions of this invention. Accordingly, it has been found that protein and protein by-product values can be increased by treating with phosphoric acid and alkylolamine to provide a complex mixture having surface active properties. The type of compositions formed are believed to be acylated amidated amino acids or acylated amidated simple peptides condensed through a phosphoric acid bridge with an alkylolamine. With many scrap proteins there is a certain amount of fat and this fat provides a very convenient source of acylating material. In accordance with the present invention, such protein derivatives may be broadly described as acylated protein alkylolamides bridged by means of a phosphated ester to an alkylolamine.

In the reaction wherein protein or protein by-product values are employed, the proteinaceous material either containing fat or having fat added thereto is reacted in a simple condensation reaction with an alkylolamine and a source of phosphoryl radicals. The ratio of protein-fat-alkylolamine-phosphoric acid is about 34–66.5–225–14.6, but larger and smaller amounts of each reactant may be employed depending upon the particular characteristics desired in the final products.

Those skilled in the art will discover that considerable variation in the final product is possible as the amounts of reactants are varied. The reaction conditions in this embodiment are similar to those set forth previously for the one-step reaction, that is, heating at an elevated temperature under vacuum until an aliquot of the reaction product is miscible with brine. Examples XV and XVI which follow show typical embodiments of this phase of the invention.

*Example XV*

Pork skins are comminuted and 152 grams of the comminuted material containing 25% protein and 45% fat are mixed with 225 grams diethanolamine and 15 grams of orthophosphoric acid (85%). The mixture is heated under vacuum with stirring for 3 hours after the temperature reaches 180° C. Although the final product is quite similar to those produced in accordance with the preceding examples, this product is superior in activity in that the foam produced by this composition is much finer and more resistant to foam breakdown.

*Example XVI*

Dehaired hide trimmings (208 grams) analyzing 4.5% fat and 18.1% protein are mixed with an additional 58 grams of tallow and 15 grams orthophosphoric acid (85%). 275 grams diethanolamine is added and the mixture is agitated vigorously and heated at 150–160° C. for about 5 hours. During the reaction the reaction vessel is maintained under a vacuum. The reaction product which is miscible with the saturated brine solution shows potent foam producing properties.

It is to be understood that the amino alcohol reactant in all of the preceding reactions can be either a pure alkylolamine or mixtures of alkylolamines or mixtures of alkylolamines with polyamines. Also the fatty acyl portion of the molecule may be made up of mixtures of fatty acids or mixtures of fatty acids and fatty acid esters. Similarly the type of product produced may be controlled by variations in (a) the length of the carbon chain in the fatty acid nucleus, (b) the nature of the amine function of the alkylolamine, i.e., primary, secondary, or tertiary, which is coupled through the phosphoric acid bridge (c), the nature of the amine function (primary or secondary) which is acylated by the fatty acid (d) the number of hydroxyl groups involved in the fatty acid alkylolamide nucleus, (e) the degree of unsaturation in the fatty acid component, and (f) the alkyl groups present in either of the alklolamine reactants.

Furthermore, although hydrated phosphorus pentoxides are suggested as the source of the phosphoric acid ester linkage, these materials are not an exclusive source for this linkage. Phosphorus oxychloride is also an available source for the phosphoric acid bridge, but the use of this composition results in the production of hydrochloric acid which must be removed. Also it is more difficult, if phosphorus oxychloride is employed, to provide a reaction product free of objectionable impurities.

Obviously many modifications and variations of the invention as hereinbefore set forth may be made without departing from the spirit and scope thereof and, therefore, only such limitations should be imposed as are indicated in the appended claim.

We claim:

Surface active compositions comprising alkylolamines bridged by means of a phosphate ester linkage to an alkylolamide, said compositions being prepared by heating a mixture of fat, protein, phosphoric acid, and alkylolamine to an elevated temperature under vacuum with removal of water until the reaction product is soluble in saturated salt solution.

References Cited by the Examiner

UNITED STATES PATENTS

| | | | |
|---|---|---|---|
| 2,052,029 | 8/1936 | Harris | 260—99.2 |
| 2,094,609 | 10/1937 | Kritchevsky | 260—124 |
| 2,143,023 | 1/1939 | Meigs | 134—20 |
| 2,441,063 | 5/1948 | Gilmann | 260—404 |
| 2,730,542 | 1/1956 | Ferrari | 260—461 |
| 3,004,056 | 10/1961 | Nunn et al. | 260—461 |
| 3,138,581 | 6/1964 | Young et al. | 260—112 |

OTHER REFERENCES

Journal of Biological Chemistry 135, 1940, page 399.
Surface Active Agents, Schwartz et al., volume II, 1958, pages 97 and 98.

SAMUEL H. BLECH, *Primary Examiner.*

WILLIAM H. SHORT, *Examiner.*

H. E. SCHAIN, *Assistant Examiner.*